(12) United States Patent
Aharoni et al.

(10) Patent No.: US 11,990,133 B2
(45) Date of Patent: *May 21, 2024

(54) AUTOMATED CALLING SYSTEM

(71) Applicant: GOOGLE LLC, Mountain View, CA (US)

(72) Inventors: Asaf Aharoni, Ramat Hasharon (IL); Arun Narayanan, Milpitas, CA (US); Nir Shabat, Geva (IL); Parisa Haghani, Jersey City, NJ (US); Galen Tsai Chuang, New York, NY (US); Yaniv Leviathan, New York, NY (US); Neeraj Gaur, Jersey City, NJ (US); Pedro J. Moreno Mengibar, Jersey City, NJ (US); Rohit Prakash Prabhavalkar, Santa Clara, CA (US); Zhongdi Qu, New York, NY (US); Austin Severn Waters, Brooklyn, NY (US); Tomer Amiaz, Tel Aviv (IL); Michiel A. U. Bacchiani, Summit, NJ (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/219,480

(22) Filed: Jul. 7, 2023

(65) Prior Publication Data
US 2023/0352027 A1 Nov. 2, 2023

Related U.S. Application Data

(63) Continuation of application No. 17/964,141, filed on Oct. 12, 2022, now Pat. No. 11,741,966, which is a continuation of application No. 17/505,913, filed on Oct. 20, 2021, now Pat. No. 11,495,233, which is a continuation of application No. 16/580,726, filed on Sep. 24, 2019, now Pat. No. 11,158,321.

(51) Int. Cl.
G10L 15/26 (2006.01)
G10L 15/32 (2013.01)
(Continued)

(52) U.S. Cl.
CPC ............. *G10L 15/26* (2013.01); *G10L 15/32* (2013.01); *H04M 1/02* (2013.01); *H04M 1/663* (2013.01);
(Continued)

(58) Field of Classification Search
CPC ......... G10L 13/00; G10L 13/08; G10L 13/10; G10L 15/22; G10L 15/26; G10L 15/32;
(Continued)

(56) References Cited

U.S. PATENT DOCUMENTS 5,815,566 A 9/1998 Ramot et al.
6,304,653 B1 10/2001 O'Neil et al.
(Continued)

FOREIGN PATENT DOCUMENTS

EP 1679693 7/2006
WO 2007065193 6/2007

OTHER PUBLICATIONS

Abadi et al, "Tensorflow: a system for large-scale machine learning," 12th USENIX Symposium on Operating Systems Design and Implementation, 21 pages; dated Nov. 2016.
(Continued)

Primary Examiner — Harry S Hong
(74) Attorney, Agent, or Firm — Gray Ice Higdon

(57) ABSTRACT

Methods, systems, and apparatus, including computer programs encoded on a computer storage medium, for an automated calling system are disclosed. In one aspect, a method includes the actions of receiving audio data of an utterance spoken by a user who is having a telephone conversation with a bot. The actions further include deter-
(Continued)

mining a context of the telephone conversation. The actions further include determining a user intent of a first previous portion of the telephone conversation spoken by the user and a bot intent of a second previous portion of the telephone conversation outputted by a speech synthesizer of the bot. The actions further include, based on the audio data of the utterance, the context of the telephone conversation, the user intent, and the bot intent, generating synthesized speech of a reply by the bot to the utterance. The actions further include, providing, for output, the synthesized speech.

18 Claims, 6 Drawing Sheets

(51) Int. Cl.
  H04M 1/02 (2006.01)
  H04M 1/663 (2006.01)
  H04M 3/428 (2006.01)
  H04M 3/51 (2006.01)
(52) U.S. Cl.
  CPC ....... *H04M 3/4286* (2013.01); *H04M 3/5191* (2013.01)
(58) Field of Classification Search
  CPC .......... H04M 1/02; H04M 1/663; H04M 3/42; H04M 3/5286; H04M 3/493; H04M 3/5158; H04M 3/5191; H04M 2201/39
  USPC ........ 379/88.16, 201.01, 235, 258, 260, 275
  See application file for complete search history.

(56) References Cited

U.S. PATENT DOCUMENTS

| | | | |
|---|---|---|---|
| 6,377,567 B1 | 4/2002 | Leonard | |
| 6,731,725 B1 | 5/2004 | Merwin et al. | |
| 6,922,465 B1 | 7/2005 | Howe | |
| 7,084,758 B1 | 8/2006 | Cole | |
| 7,337,158 B2 | 2/2008 | Fratkina et al. | |
| 7,539,656 B2 | 5/2009 | Fratkina et al. | |
| 7,792,773 B2 | 9/2010 | McCord et al. | |
| 7,920,678 B2 | 4/2011 | Cooper et al. | |
| 8,345,835 B1 | 1/2013 | Or-Bach et al. | |
| 8,594,308 B2 | 11/2013 | Soundar | |
| 8,938,058 B2 | 1/2015 | Soundar | |
| 8,964,963 B2 | 2/2015 | Soundar | |
| 9,232,369 B1 | 1/2016 | Fujisaki | |
| 9,318,108 B2 | 4/2016 | Gruber et al. | |
| 9,467,566 B2 | 10/2016 | Soundar | |
| 11,158,321 B2 | 10/2021 | Aharoni et al. | |
| 11,495,233 B2 | 11/2022 | Aharoni | |
| 11,741,966 B2 * | 8/2023 | Aharoni .................. | G10L 15/32 379/88.16 |
| 2002/0051522 A1 | 5/2002 | Merrow et al. | |
| 2002/0055975 A1 | 5/2002 | Petrovykh | |
| 2003/0009530 A1 | 1/2003 | Philonenko et al. | |
| 2003/0063732 A1 | 4/2003 | Mcknight | |
| 2004/0001575 A1 | 1/2004 | Tang | |
| 2004/0083195 A1 | 4/2004 | McCord et al. | |
| 2004/0213384 A1 | 10/2004 | Alles et al. | |
| 2004/0240642 A1 | 12/2004 | Crandell et al. | |
| 2005/0147227 A1 | 7/2005 | Chervirala et al. | |
| 2005/0175168 A1 | 8/2005 | Summe et al. | |
| 2005/0271250 A1 | 12/2005 | Vallone et al. | |
| 2006/0039365 A1 | 2/2006 | Ravikumar et al. | |
| 2006/0056600 A1 | 3/2006 | Merrow et al. | |
| 2007/0036320 A1 | 2/2007 | Mandalia et al. | |
| 2007/0201664 A1 | 8/2007 | Salafia | |
| 2008/0209449 A1 | 8/2008 | Maehira | |
| 2008/0309449 A1 | 12/2008 | Martin et al. | |
| 2009/0022293 A1 | 1/2009 | Routt | |
| 2009/0029674 A1 | 1/2009 | Brezina et al. | |
| 2009/0089096 A1 | 4/2009 | Schoenberg | |
| 2009/0089100 A1 | 4/2009 | Nenov et al. | |
| 2009/0137278 A1 | 5/2009 | Haru et al. | |
| 2009/0232295 A1 | 9/2009 | Ryskamp | |
| 2010/0088613 A1 | 4/2010 | DeLuca et al. | |
| 2010/0104087 A1 | 4/2010 | Byrd et al. | |
| 2010/0228590 A1 | 9/2010 | Muller et al. | |
| 2011/0092187 A1 | 4/2011 | Miller | |
| 2011/0270687 A1 | 11/2011 | Bazaz | |
| 2012/0016678 A1 | 1/2012 | Gruber et al. | |
| 2012/0109759 A1 | 5/2012 | Oren et al. | |
| 2012/0147762 A1 | 6/2012 | Hancock et al. | |
| 2012/0157067 A1 | 6/2012 | Turner et al. | |
| 2012/0173243 A1 | 7/2012 | Anand et al. | |
| 2012/0271676 A1 | 10/2012 | Aravamudan et al. | |
| 2013/0060587 A1 | 3/2013 | Bayrak et al. | |
| 2013/0077772 A1 | 3/2013 | Lichorowic et al. | |
| 2013/0090098 A1 | 4/2013 | Gidwani | |
| 2013/0136248 A1 | 5/2013 | Kaiser-Nyman et al. | |
| 2013/0163741 A1 | 6/2013 | Balasaygun et al. | |
| 2013/0275164 A1 | 10/2013 | Gruber et al. | |
| 2014/0024362 A1 | 1/2014 | Kang et al. | |
| 2014/0029734 A1 | 1/2014 | Kim et al. | |
| 2014/0037084 A1 | 2/2014 | Dutta | |
| 2014/0107476 A1 | 4/2014 | Tung et al. | |
| 2014/0200928 A1 | 7/2014 | Watanabe et al. | |
| 2014/0247933 A1 | 9/2014 | Soundar | |
| 2014/0310365 A1 | 10/2014 | Sample et al. | |
| 2015/0139413 A1 | 5/2015 | Hewitt et al. | |
| 2015/0142704 A1 | 5/2015 | London | |
| 2015/0150019 A1 | 5/2015 | Sheaffer et al. | |
| 2015/0237203 A1 | 8/2015 | Siminoff | |
| 2015/0248817 A1 | 9/2015 | Steir et al. | |
| 2015/0281446 A1 | 10/2015 | Milstein et al. | |
| 2015/0339707 A1 | 11/2015 | Harrison et al. | |
| 2015/0350331 A1 | 12/2015 | Kumar | |
| 2015/0358790 A1 | 12/2015 | Nasserbakht | |
| 2016/0105546 A1 | 4/2016 | Keys et al. | |
| 2016/0139998 A1 | 5/2016 | Dunn et al. | |
| 2016/0198045 A1 | 7/2016 | Kulkarni et al. | |
| 2016/0227033 A1 | 8/2016 | Song | |
| 2016/0227034 A1 | 8/2016 | Kulkarni et al. | |
| 2016/0277569 A1 | 9/2016 | Shine et al. | |
| 2016/0379230 A1 | 12/2016 | Chen | |
| 2017/0037084 A1 | 2/2017 | Fasan | |
| 2017/0039194 A1 | 2/2017 | Tschetter | |
| 2017/0061091 A1 | 3/2017 | McElhinney et al. | |
| 2017/0094052 A1 | 3/2017 | Zhang et al. | |
| 2017/0177298 A1 | 6/2017 | Hardee et al. | |
| 2017/0180499 A1 | 6/2017 | Gelfenbeyn et al. | |
| 2017/0289332 A1 | 10/2017 | Lavian et al. | |
| 2017/0358296 A1 | 12/2017 | Segalis et al. | |
| 2017/0359463 A1 | 12/2017 | Segalis et al. | |
| 2017/0359464 A1 | 12/2017 | Segalis et al. | |
| 2017/0365277 A1 | 12/2017 | Park | |
| 2018/0124255 A1 | 5/2018 | Kawamura et al. | |
| 2018/0133900 A1 | 5/2018 | Breazeal et al. | |
| 2018/0220000 A1 | 8/2018 | Segalis et al. | |
| 2018/0227416 A1 | 8/2018 | Segalis et al. | |
| 2018/0227417 A1 | 8/2018 | Segalis et al. | |
| 2018/0227418 A1 | 8/2018 | Segalis et al. | |
| 2018/0317064 A1 | 11/2018 | Kim | |
| 2019/0189123 A1 | 6/2019 | Sugiyama et al. | |
| 2019/0197396 A1 | 6/2019 | Rajkumar et al. | |
| 2020/0035244 A1 | 1/2020 | Kim | |
| 2021/0005191 A1 | 1/2021 | Chun et al. | |
| 2021/0082410 A1 | 3/2021 | Teserra | |
| 2021/0090570 A1 | 3/2021 | Aharoni et al. | |
| 2022/0044684 A1 | 2/2022 | Aharoni et al. | |
| 2023/0038343 A1 | 2/2023 | Aharoni et al. | |

OTHER PUBLICATIONS

Bandanau et al, "Neural machine translation by jointly learning to align and translate," arXiv; 15 pages; dated May 19, 2016.

Bengio et al, "Scheduled sampling for sequence prediction with recurrent neural networks," arXiv, 9 pages; dated Sep. 23, 2015.

(56) References Cited

OTHER PUBLICATIONS

Caruana et al, "Multitask learning," Springer, ; 35 pages; dated 1997.
Chan et al, "Listen, attend, and spell: a neural network for large vocabulary conversational speech recognition," arXiv, 16 pages; dated Aug. 20, 2015.
Chen et al, "Spoken language understanding without speech recognition," in IEEE Xplore, 5 pages; dated 2018.
Chiu et al, "State-of-the-art speech recognition with sequence-to-sequence models," arXiv; 5 pages; dated Feb. 23, 2018.
Cho, K. et al, "Learning phrase representations using rnn encoder-decoder for statistical machine translation," arXiv:1406.1078, 15 pages; dated Sep. 3, 2014.
Erik F., "Introduction to the conll-2003 shared tasks: language-independent named entity recognition," CNTS-Language Technology Group, 4 pages; dated 2003.
googleblog.com [online], An AI system for accomplishing real-world tasks over the phone, May 8, 2018, retrieved from: URL<https://ai.googleblog.com/2018/05/duplex-ai-system-for-natural-conversation.html>, 6 pages; retrieved Sep. 24, 2019.
Graves et al, "Connectionist temporal classification: labelling unsegmented sequence data with recurrent neural networks," ACM, 8 pages; dated 2006.
Hakkani-Tur, "Beyond asr 1-best: using word confusion networks in spoken language understanding," Computer Speech & Language, dated 2006.
Hakkani-Tur, "Multi-domain joint semantic frame parsing using bi-directional rnn-lstm," Interspeech, 5 pages; dated Sep. 2016.
Jouppi et al, "In-datacenter performance analysis of tensor processing unit," in 44th International Symposium on Computer Architecture, 17 pages; dated Jun. 26, 2017.
Kim et al, "Onenet: joint domain, intent, slot prediction for spoken language understanding," in Automatic Speech Recognition and Understanding Workshop (ASRU), ArXiv, 7 pages; dated Jan. 16, 2018.
Kingma et al, "Adam: A method for stochastic optimization," arXiv, 15 pages; dated Jan. 30, 2017.
Adhak et al, "LatticeRNN: recurrent neural network over lattices," Interspeech, 5 pages; dated Sep. 2016.
Li et al, "Acoustic modeling for a google home," Interspeech, 5 pages; dated 2017.
Lu et al, "Attention-based recurrent neural network models for joint intent detection and slot filling," arXiv, 5 pages; dated Sep. 6, 2016.
Luong et al, "Multi-task sequence to sequence learning," arXiv, 10 pages; dated Mar. 1, 2016.
Morbini et al, "A reranking approach fo recognition and classification of speech input in conversational dialogue systems," IEEE Xplore, 6 pages; dated 2012.
Prabhavalkar et al, "Minimum word error rate training for attention-based sequence-to-sequence models," arXiv, 5 pages; dated Dec. 5, 2017.
Sak et al, "Fast and accurate recurrent neural network acoustic models for speech recognition;" arXiv, 5 pages Jul. 24, 2015.
Saon et al, "English conversational telephone speech recognition by humans and machines," arXiv, 7 pages; dated Mar. 6, 2017.
Schmidhuber et al, "Long short-term memory," Neural Compute, 9(8): 1735-1780, 32 pages; dated 1997.
Schumann et al, "Incorporating asr errors with attention-based, jointly trained rnn for intent detection and slot filling," Acoustics, Speech, and Signal Processing (ICASSP), 5 pages; dated 2018.
Schuster et al, "Bidirectional recurrent neural networks," IEEE Xplore, 9 pages; dated Nov. 1997.
Berdyuk et al, "Towards end-to-end spoken language understanding," arXiv, 5 pages; dated Feb. 23, 2018.
Shannon, "Optimizing expected word error rate via sampling for speech recognition," arXiv, 5 pages; dated Jun. 8, 2017.
Stolcke et al, "Comparing human and machine errors in conversational speech transcription," Interspeech, ArXiv, 5 bages; dated Aug. 29, 2017.
Sutskever et al, "Sequence to sequence learning with neural networks," in Advances in neural information with neural hetworks, 9 pages; dated 2014.
Vaswani et al, "Attention is all you need," arXiv, 15 pages; dated Dec. 6, 2017.
Wu et al, "Google's neural machine translation system: bridging the gap between human and machine translation," arXiv, 23 pages; dated Oct. 8, 2016.

* cited by examiner

*"play hot n cold by katy perry"*

Domain: MEDIA
 Intent: PLAY_SONG
 song_name: hot n cold
 artist_name: katy perry

*"put on npr"*

Domain: MEDIA
 Intent: PLAY_RADIO
 station_name: npr

*"set an alarm for 5 p.m."*

Domain: PRODUCTIVITY
 Intent: SET_ALARM
 date_time: 5 p.m.

*"cancel timer"*

Domain: PRODUCTIVITY
 Intent: CANCEL_TIMER

FIG. 4

AUTOMATED CALLING SYSTEM

TECHNICAL FIELD

This specification relates to natural language processing.

BACKGROUND

Natural language processing involves the interactions between computers and human languages, in particular how to program computers to process and analyze natural language data. Natural language processing may involve speech recognition, natural language understanding, and natural language generation.

SUMMARY

Users may need to collect types of information that is not easily obtained without human interaction. For example, in order to verify or collect data from multiple places of business or organizations, a user may need to call each of the businesses or organizations in order to gather the information. While web search engines can assist users with such tasks by providing contact information for a service or business, the user must still call the service or business themselves to complete the task themselves.

In order to maintain a database of information gathered from multiple places of business or organizations, a human operator can initiate automated calls to large numbers of businesses to collect data, but selecting the callees (e.g., all restaurants in a particular town that serve the same cuisine) and placing the calls can be time-consuming when performed manually. Moreover, determining when and whether to place the calls generally requires human analysis of existing data in order to identify a need for verification, updating, or supplemental information.

Users may also wish to perform tasks such as make appointments or hire a service. However, there is generally a person with whom a user must interact to complete the desired task. For example, a user may be required to call and speak with a hostess in order to make a reservation at a small restaurant that does not have a website. In some cases, even when users place the calls themselves, they may encounter automated phone trees that often accept only a limited set of user responses.

To assist users in performing tasks that may require placing a phone call, an automated calling system may use a bot to call and conduct a telephone conversation with a human. The bot may understand what the human is saying and respond as needed to complete the task. For example, if the task involves making a restaurant reservation, the bot may be able to respond to the question of "What time would you like?" by saying "Tomorrow at 7 pm."

For the bot to determine an appropriate response, the automated calling system may use a model that is configured to generate an intent for each of the bot's statements. The intent may be a framework for a statement. An intent for "tomorrow at 7 pm" may be <provide date and time>. The intent for "Saturday at 8 pm" may also have the same intent. The automating calling system may use the intent and the context of the telephone call to generate a transcription of an appropriate response to the human's utterance. The automating calling system may then provide the transcription to a speech synthesizer.

To generate the intent, the automated calling system may provide the model with data related to the context of the telephone call, any previous intents from the telephone call, and the audio of the human's speech to which the bot should respond. The automated calling system may train this model using machine learning and previous telephone conversations related to completing tasks that the bot may be performing.

According to an innovative aspect of the subject matter described in this application, a method for implementing an automated calling system includes the actions of receiving, by one or more computing devices, audio data of an utterance spoken by a user who is having a telephone conversation with a bot; determining, by the one or more computing devices, a context of the telephone conversation; determining, by the one or more computing devices, a user intent of a first previous portion of the telephone conversation spoken by the user and a bot intent of a second previous portion of the telephone conversation outputted by a speech synthesizer of the bot; based on the audio data of the utterance, the context of the telephone conversation, the user intent, and the bot intent, generating, by the one or more computing devices, synthesized speech of a reply by the bot to the utterance; and providing, for output by the one or more computing devices, the synthesized speech.

These and other implementations can each optionally include one or more of the following features. The context of the telephone conversation includes an identity of an entity associated with the user and a task associated with the telephone conversation. The action of generating the synthesized speech of the reply by the bot to the utterance includes determining an additional bot intent of the reply by the bot to the utterance; based on the additional bot intent, generating a transcription of the reply by the bot to the utterance; and based on the transcription, generating, using the speech synthesizer, the synthesized speech of the reply by the bot to the utterance. The actions further include bypassing, by the one or more computing devices, performing speech recognition on the utterance spoken by the user.

The actions further include accessing historical data for previous telephone conversations, wherein the historical data includes, for each previous telephone conversation, (i) a previous context of the previous telephone conversation, (ii) previous first speaker intents of portions of the previous telephone conversation spoken by a first speaker, (iii) previous second speaker intents of portions of the previous telephone conversation spoken by the second speaker, (iv) previous audio data of a most recent utterance of the first speaker of the second speaker during the previous telephone conversation, and (v) a previous intent of a previous reply to the most recent utterance; and training, using machine learning and the historical data, a model that is configured to receive (i) audio data of a most recent given utterance of a given telephone conversation, (ii) a given user intent of a first portion of the given telephone conversation spoken by a given user, (iii) a given bot intent of a second portion of the given telephone conversation outputted by the speech synthesizer of the bot, and (iv) a given context of the given telephone conversation and output a given intent for a given reply to the most recent given utterance.

The action of generating the synthesized speech of the reply by the bot to the utterance includes providing the audio data of the utterance, the context of the telephone conversation, the user intent, and the bot intent as inputs to the model; receiving, from the model, an additional bot intent of the reply by the bot to the utterance; and, based on the additional bot intent of the reply by the bot to the utterance, generating the synthesized speech of the reply by the bot to the utterance. The one or more computing devices include a call initiating system is configured to initiate telephone calls and conduct telephone conversations between the bot of the call initiating system and a recipient. An intent of a portion of the telephone conversation identifies a type of information conveyed in the portion of the telephone conversation.

Other implementations of this aspect include corresponding systems, apparatus, and computer programs recorded on computer storage devices, each configured to perform the operations of the methods. Other implementations of this aspect include a computer-readable medium storing software comprising instructions executable by one or more computers which, upon such execution, cause the one or more computers to perform operations comprising any of the methods described herein.

Particular implementations of the subject matter described in this specification can be implemented so as to realize one or more of the following advantages. A computing device may be configured to complete tasks for a user that require placing a telephone call. The computing device may be able to use data from previous conversations and machine learning to generate appropriate responses to the person who answers the phone.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates transcripts of example telephone conversations and their corresponding domain, intent, and arguments.

Like reference numbers and designations in the various drawings indicate like elements.

DETAILED DESCRIPTION

Figure 1:
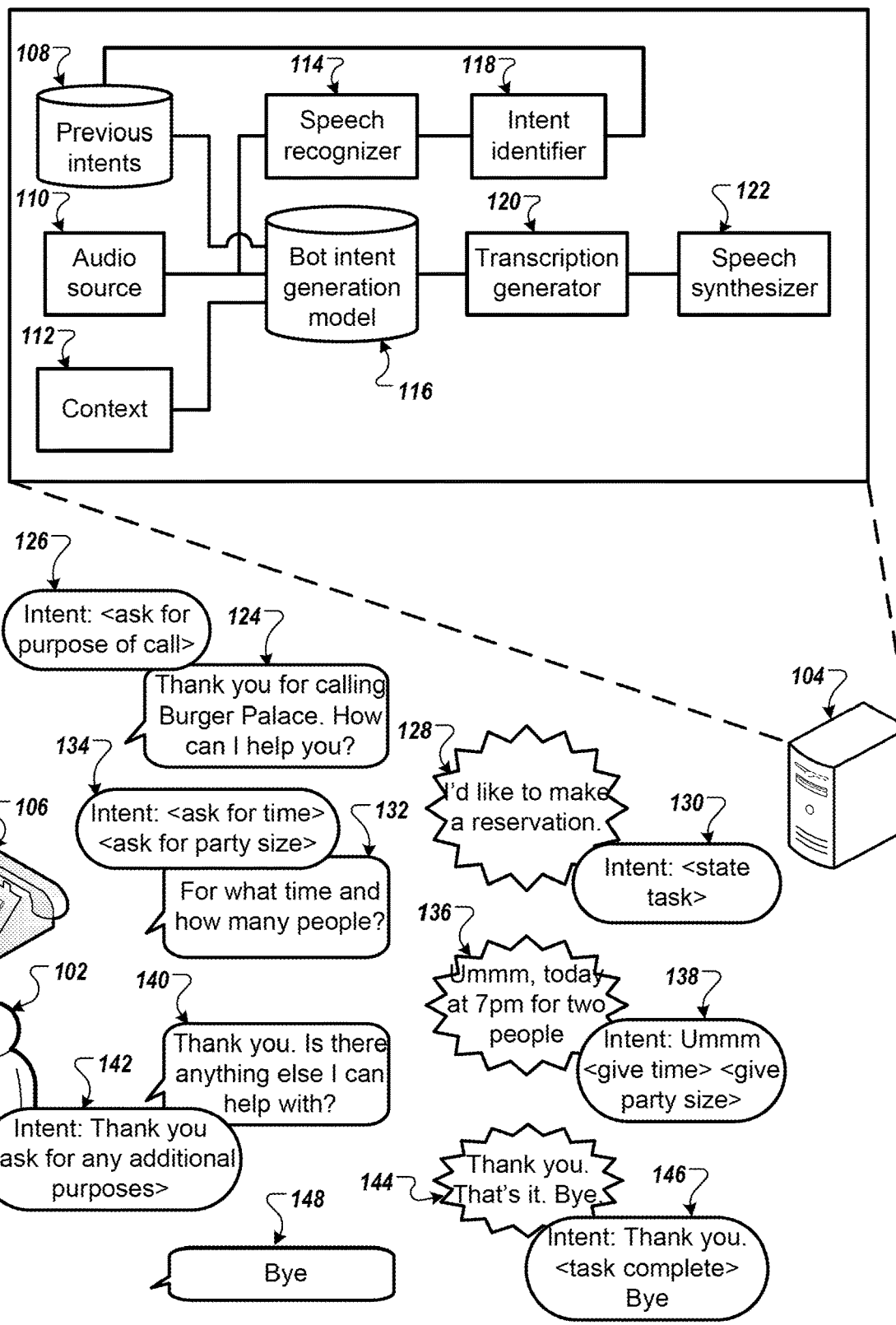
FIG. 1 illustrates an example system for conducting a telephone conversation with a human using a bot.

FIG. 1 illustrates an example system 100 for conducting a telephone conversation with a human representative 102 using a bot. Briefly, and as described in more detail below, the call initiating system 104 is performing a task for a user by placing a telephone call. The human representative 102 answers the telephone call and has a telephone conversation with the bot of the call initiating system 104. During the telephone call, the call initiating system 104 uses the intents of the previous portions of the telephone conversation, the context of the telephone conversation, and the audio of an utterance of the human representative 102 to determine how the bot of the call initiating system 104 should respond to the utterance of the human representative 104.

In more detail, a user may be interacting with a digital assistant and requests that the digital assistant make a reservation for Burger Palace that same day for two people at 7:00 pm. Burger Palace may be a small restaurant that does not have an online portal where the digital assistant can request the reservation. Instead, prospective patrons must call Burger Palace on the telephone to make a reservation. In this case, the digital assistant requests that the call initiating system 104 initiate a telephone call with the restaurant and make the reservation.

The digital assistant provides the call initiating system 104 with information related to the request. The information may include the requested date and time for the reservation, the name of the restaurant, and the number of people in the party. For requests other than restaurant reservations, the information may include the name of a requested service provider, a description of any type of problem for the service provider to address, and any other similar information. The call initiating system 104 may store this data as part of the context 112. The context 112 may include additional information such as the time that the call initiating system 104 places the telephone call, the location of the restaurant, the location of the user requesting the reservation, and any other similar contextual information. In some implementations, the context 112 may change. For example, if the location of the user requesting the reservation changes, then the corresponding data in the context 112 may change.

The call initiating system 104 initiates a telephone call with Burger Palace and the human representative 102 answers the phone 106. The human representative speaks the utterance 124 by saying, "Thank you for calling Burger Palace. How can I help you?" The call initiating system 104 detects the utterance 124. Because the call initiating system 104 uses a bot to conduct the telephone conversation with the human representative 102, the call initiating system 104 analyzes the current state of the call to determine and generate an appropriate response to the utterance 124.

To generate an appropriate response to the utterance 124, the call initiating system 104 uses a bot intent generation model 116. The bot intent generation model 116 is configured to receive the audio of the utterance, the context 112, and any previous intents from portions of the telephone conversation spoken by the human representative 102 or by the bot of the call initiating system 104. The bot intent generation model 116 is configured to output an intent from which the call initiating system 104 generates a response for the bot to speak using the speech synthesizer 122.

An intent of a portion of the telephone conversation represents a template of a summary of what the human representative 102 said or what the bot has said or will say using the speech synthesizer 122. An intent may identify the type of information included in the portion of the telephone conversation. In some implementations, different portions of telephone conversations may correspond to the same intent but have different transcriptions. For example, the intent of <ask for purpose of call> may correspond to the transcription of "How can I help you?," "How can I direct your call?", "May I help you?", or any other similar portion of a telephone conversation.

In the example shown in FIG. 1, the call initiating system 104 receives the audio data of the utterance 124. The audio source 110 represents the audio of the utterance 124 being inputted into the bot intent generation model 116. At this point in the conversation, there are no previous intents because neither the human representative 102 nor the bot has said anything. Therefore, the bot intent generation model 116 receives no previous intents 108 at this point. The other input to the bot intent generation model 116 is the context 112. The context 112 may include information such as the identity of the entity the human 102 represents, the time of the telephone call, the task that the call initiating system 104 is attempting to complete, and any other similar information.

The bot intent generation model 116 outputs an intent 130 that provides a framework for a reply that the bot will speak to the utterance 124. The intent 130 is <state task>. The bot intent generation model 116 provides the intent 130 to the previous intents 108. The previous intents 108 stores the intent 130 for later use by the bot intent generation model 116. The bot intent generation model 116 also provides the intent 130 to the transcription generator 120. The transcription generator 120 generates a transcription based on the intent 130. In some implementations, the transcription generator 120 also generates a transcription based on the context 112. In this instance, the transcription generator 120 generates the transcription, "I'd like to make a reservation." The transcription generator 120 provides the transcription to the speech synthesizer 122, which generates the synthesized utterance 128 that is output by the call initiating system 104.

In some implementations, the call initiating system 104 identifies and stores an intent 126 for the utterance 124 while generating the synthesized utterance 128. To generate the intent 126 for the utterance 124, the call initiating system 104 performs speech recognition on the audio data of the utterance 124. The speech recognizer 114 provides the transcription of the utterance 124 to the intent identifier 118. The intent identifier 118 may be similar to the transcription generator 120 except that the intent identifier 118 operates in reverse of the transcription generator 120. The intent identifier 118 receives the transcription of the utterance 124 and generates the intent 126 of <ask for purpose of call>. The call initiating system 104 stores the intent 126 in the previous intents 108.

The human representative 102 hears the synthesized utterance 128 of "I'd like to make a reservation." The human representative 102 responds by speaking utterance 132, "For what time and how many people?" The call initiating system 104 receives the audio of the utterance 132 and provides the audio to the bot intent generation model 116 along with the context 112. The context 112 may include the same information as when the bot intent generation model 116 analyzed the audio of the utterance 124. In this instance, the previous intents 108 includes the previous intents of utterance 124 and synthesized utterance 130. The call initiating system 104 provides both intent 126 and intent 130 to the bot intent generation model 116. In other words, the bot intent generation model 116 receives the audio of the utterance 132 from the audio source 110, the context 112, and the previous intents 108 of any utterances spoken by the human representative 102 and any synthesized utterance outputted by the bot.

The bot intent generation model 116 outputs the intent 138 that provides a framework for generating the synthesized utterance 136. The transcription generator 120 receives the intent 138 and outputs the transcription for the synthesized utterance 136. The speech synthesizer 122 generates the audio of the synthesized utterance 136, and the call initiating system 104 outputs the audio of the synthesized utterance 136. In this instance, the intent 138 is "ummm <give time> <give party size>." The bot intent generation model 116 may include disfluencies such as "ummm" in some intents in order to provide more realistic synthesized speech that better mimics a real person. The transcription generator 120 includes "ummm" in the transcription and adds "today at 7 pm for two people" to match the "<give time> <give party size>" intent. The speech synthesizer generates the synthesized utterance 136 of the complete transcription "ummm, today at 7 pm for two people."

In some implementations, the call initiating system 104 identifies and stores an intent 134 for the utterance 132 while generating the synthesized utterance 136. To generate the intent 134 for the utterance 132, the call initiating system 104 performs speech recognition on the audio data of the utterance 132. The speech recognizer 114 provides the transcription of the utterance 132 to the intent identifier 118. The intent identifier 118 identifies the intent 126 of <ask for time> <ask for party size> for utterance 132. The call initiating system 104 stores the intent 134 in the previous intents 108.

The human representative 102 hears the synthesized utterance 136 of "Ummm, today at 7 pm for two people." The human representative 102 responds by speaking utterance 140, "Thank you. Is there anything else I can help with?" The call initiating system 104 receives the audio of the utterance 140 and provides the audio to the bot intent generation model 116 along with the context 112. In this instance, the previous intents 108 includes the previous intents of utterance 124, utterance 132, synthesized utterance 130, and synthesized utterance 138. The call initiating system 104 provides intent 126, intent 130, intent 134, and intent 138 to the bot intent generation model 116. In other words, the bot intent generation model 116 receives the audio of the utterance 140 from the audio source 110, the context 112, and the previous intents 108 of any utterances spoken by the human representative 102 and any synthesized utterance outputted by the bot.

The bot intent generation model 116 outputs the intent 146 that provides a framework for generating the synthesized utterance 144. The transcription generator 120 receives the intent 146 and outputs the transcription for the synthesized utterance 144. The speech synthesizer 122 generates the audio of the synthesized utterance 144, and the call initiating system 104 outputs the audio of the synthesized utterance 144. In this instance, the intent 146 is "Thank you. <task complete>. Bye." Similar to intent 138, intent 146 may include terms that should be included in the transcription. The bot intent generation model 116 generates the intent 146 that includes the terms "thank you" and "bye." These terms may not convey any particular information to the human representative 102 and may be included to better mimic human conversation. The transcription generator 120 receives the intent 146 and generates the transcription "that's it" to match the <task complete> intent. The transcription generator 120 combines the terms "thank you" and "bye" with "that's it" in the order specified by the intent 146 to generate "Thank you. That's it. Bye." The speech synthesizer 122 generates the synthesized utterance 144 of the complete transcription "Thank you. That's it. Bye."

In some implementations, the call initiating system 104 identifies and stores an intent 142 for the utterance 140 while generating the synthesized utterance 144. To generate the intent 142 for the utterance 140, the call initiating system 104 performs speech recognition on the audio data of the utterance 140. The speech recognizer 114 provides the transcription of the utterance 140 to the intent identifier 118. The intent identifier 118 identifies the intent 142 of <ask for any additional purposes> for utterance 140. The call initiating system 104 stores the intent 142 in the previous intents 108.

The human representative 102 hears the synthesized utterance 144 of "Thank you. That's it. Bye." The human representative 102 responds by speaking utterance 148, "Bye." The call initiating system 104 receives the audio of the utterance 148 and provides the audio to the bot intent generation model 116 along with the context 112. In this instance, the previous intents 108 includes the previous intents of utterance 124, utterance 132, utterance 142, synthesized utterance 130, synthesized utterance 138, and synthesized utterance 1144. The call initiating system 104 provides intent 126, intent 130, intent 134, intent 138, intent 142, and intent 146 to the bot intent generation model 116. In other words, the bot intent generation model 116 receives the audio of the utterance 148 from the audio source 110, the context 112, and the previous intents 108 of any utterances spoken by the human representative 102 and any synthesized utterance outputted by the bot.

At this point, the conversation is complete. The bot intent generation model 116 outputs a null intent which indicates that the human representative 102 has ended the telephone conversation. Based on the null intent, the call initiating system 104 may hang up the phone.

In some implementations, the call initiating system 104 may not generate an intent for each of the utterances spoken by the human representative 102. In this case, the previous intents 108 may only include intent 130, intent 138, and intent 146 at the end of the telephone conversation. The speech recognizer 114 may not generate transcriptions of utterance 124, utterance 132, utterance 140, or utterance 148. Therefore, the intent identifier 118 may not generate intents for the utterance 124, utterance 132, utterance 140, or utterance 148. Without intents for each of the utterances spoken by the human representative 102, the bot intent generation model 116 may receive the audio of the current utterance from the human representative 102, the context 112, and the previous intents generated by the bot intent generation model 116.

In some implementations, the system 100 may use the transcriptions of the utterances of the human representative 102 instead of the intents. In this instance, the inputs to the bot intent generation model 116 are the previous intents, if any, of the previous synthesized utterances of the call initiating system 104; the transcriptions, if any, of the previous utterances of the human representative 102; the context 112, and the audio source 110 that includes the audio of the current utterance of the human representative. In this case, the training data for the bot intent generation model 116 includes training samples that include transcriptions of the previous utterances of the current speaker instead of intents of the previous utterance of the current speaker. The current speaker is the speaker of the utterance that has the audio data of the utterance included in the training sample. The previous utterances of the other speaker are represented by their respective intents. The other speaker is the speaker for which the training sample includes an output that is an intent.

In some implementations, the bot intent generation model 116 and the intent identifier 118 are included in the same model. In this case, the bot intent generation model 116 outputs an intent of the audio included in the audio source 110. The call initiating system 104 may store the intent in the previous intents 108 and treat the intent similar to an intent generated by stand-alone intent identifier 118. To train the bot intent generation model 116 to generate an intent of the audio data of the audio source 110, a trainer may use training samples that are similar to the training samples used to train the bot intent generation model 116 without the included intent identifier 118. The training samples include an additional output of an intent for the audio data of the current speaker. By having a model that is able to perform more than one task, the efficiency of the training process and the accuracy of the predictions may be improved. With a combined bot intent generation model 116 and intent identifier 118, call initiating system 104 may not include a speech recognizer 114, and there may be no need to perform speech recognition 114 on any utterance spoken by the human representative 102.

Figure 2:
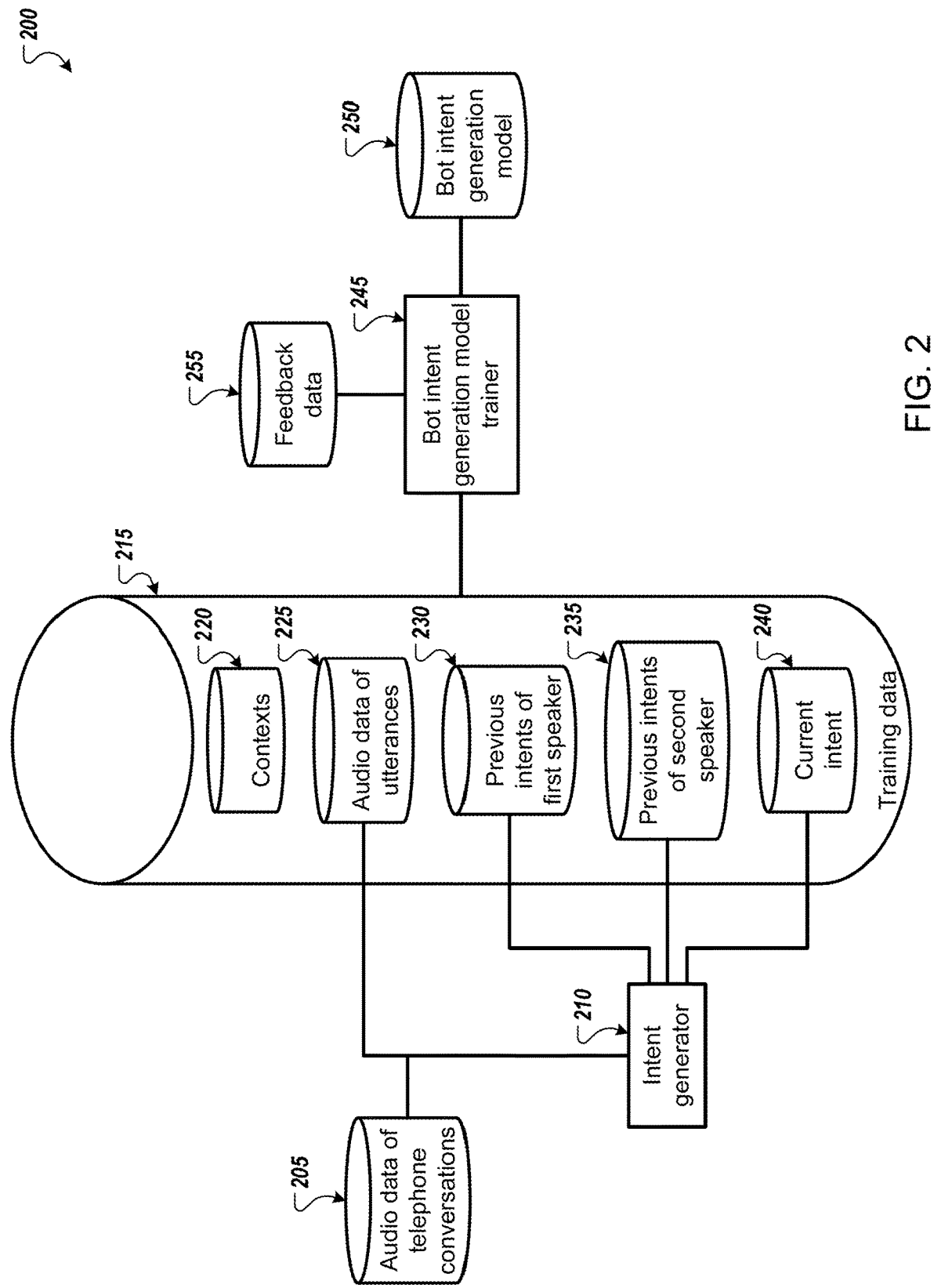
FIG. 2 illustrates an example system for training a system to conduct a telephone conversation with a human using a bot.

FIG. 2 illustrates an example system 200 for training a system to conduct a telephone conversation with a human using a bot. Briefly, and as described in more detail below, the system 200 trains the bot intent generation model 250 using machine learning. The bot intent generation model trainer 245 may use training data 215 from previous telephone conversations to train the bot intent generation model 250. The bot intent generation model 250 may be used as part of a call initiating system such as call initiating system 104 with the bot intent generation model 116 of FIG. 1.

In more detail, the system 200 accesses audio data of telephone conversations 205. These telephone conversations may be between two humans. They may be collected during performance of particular tasks such as making a reservation at a restaurant, scheduling an appointment at a hair salon, scheduling an appointment at a car mechanic, or any other similar task that may require placing a telephone call. The telephone conversations may include conversations that both successfully completed the task did not complete the task.

The training data 215 may include context data 220. The context data 220 may include any data related to the telephone conversation that may be outside of the transcriptions and the audio data. The context may include the task being performed during the conversation, the identity of each party or an entity associated with each party, the current day and time, and/or any other similar information. An example context may be that the caller is calling John's Auto Shop. One of the participants is an employee of John's Auto Shop. The other participant is the person wishing to make an appointment for a car repair. The caller may place the call on Jul. 10, 2019 at 10:30 am. Each telephone conversation may have a different context in the context data 220.

The training data 215 may include audio data of utterances 225 of the telephone conversations. In this case, an utterance may include what a speaker says before the other speaker says something. This may be similar to a line of dialog. An utterance may be more than one sentence or less than a complete sentence. For example, utterance 124 of FIG. 1 includes two sentences. FIG. 1 also include other examples such as utterance 132, utterance 140, and utterance 148. The synthesized utterances 128, 136, and 144 may also be utterances. In some implementations, audio data of utterances 225 may not include audio data of synthesized utterances.

Each utterance stored in the audio data of utterance 225 may be provided to the intent generator 210. The intent generator 210 is configured to receive an utterance and generate an intent of that utterance. In some implementations, the intent generator 210 includes a speech recognizer that generates a transcription of each utterance. The intent generator 210 may analyze, tokenize, and/or parse each transcription of each utterance and generate the intent based on the analyzed, tokenized, and/or parsed transcription. In some implementations, the intent generator may use machine learning to generate an intent from a transcription. In this case, the trainer may access training data that includes transcriptions and matching intents. The trainer may use machine learning to generate a model for the intent generator. The training data may use the transcriptions as the input and the matching intents as the output. In this sense, the model for intent generator 210 is configured to receive a transcription of an utterance and output an intent. In some implementations, the system may train a model to receive an intent and generate a transcription. In some implementations, the intent generator 210 may be configured to generate an intent directly from the audio data. In this case, the intent generator 210 may not include or receive data from a speech recognizer. Instead, the intent generator 210 receives audio data of an utterance and generates an intent directly from the audio data. In this case, a training sample may include audio data and an intent. The trainer may use machine learning to generate a model for the intent generator 210 using multiple training samples where the model is configured to receive audio data and output an intent that corresponds to that audio data. In some implementations, the intent identifier 210 may be trained to receive both the audio data and the transcription of the audio data and output the intent. In this case, a training sample may include audio data, a transcription of the audio data, and an intent. The trainer may use machine learning to generate a model for the intent generator 210 using multiple training samples where the model is configured to receive audio data of an utterance and a transcription of the utterance and output the intent of the utterance.

The system 200 stores the intents for each of the transcriptions in one or more of the previous intents of the first speaker 230, the previous intents of the second speaker 235, and the current intent 240. The training data 215 may include multiple training samples. Each telephone conversation may generate multiple training samples. As an example, a telephone conversation may begin with an employee of John's Auto Shop saying, "John's Auto Shop. What can I do for you?" The intent generator 210 may generate an intent of "<identify entity> <ask for purpose of call>." The caller may respond by saying, "Can I bring my car in for an oil change now?" The intent generator 210 may generate an intent of "<provide purpose of call>." The employee may respond by saying, "Yes, please come in. We have time." The intent generator 210 may generate an intent of "please <request visiting entity at present time>." The caller may respond by saying, "Great, see you soon. Bye" and hang up the phone. The intent generator 210 may generate an intent of "great <agree to arrive at present time> bye."

The training data 215 may include three training samples for this example telephone conversation. The first speaker may be the employee, and the second speaker may be the person trying to get the oil change. Each of the training samples will include the context data 220 of calling John's Auto Shop for an oil change near the time of the telephone call. The context data may also include the time of the telephone call. The first training sample may correspond to the first and second lines of the telephone conversation. The audio data of the utterance 225 is the audio data of "John's Auto Shop. What can I do for you?" Because this is the beginning of the conversation, the previous intent of the first speaker 230 is empty, and the previous intent of the second speaker 235 is also empty. The current intent 240 is <provide purpose of call>, which is the intent of the reply to "John's Auto Shop. What can I do for you?"

The second training sample may correspond to the second and third lines of the telephone conversation. The audio data of the utterance 225 is the audio data of "Can I bring my car in for an oil change now?" Because the second speaker has not spoken until this point, the previous intent of the second speaker 235 is empty. The previous intent of the first speaker 230 is <identify entity> <ask for purpose of call>. The current intent 240 is "please <request visiting entity at present time>," which is the intent of the reply to "Can I bring my car in for an oil change now?"

The third training sample may correspond to the third and fourth lines of the telephone conversation. The audio data of the utterance 225 is the audio data of "Yes, please come in. We have time." The previous intent of the first speaker 230 is <identify entity> <ask for purpose of call>. The previous intent of the second speaker 235 is <provide purpose of call>. The current intent 240 is "great <agree to arrive at present time> bye," which is the intent of the reply to "Yes, please come in. We have time."

The training data includes these example training samples and training sample from other telephone conversations. The bot intent generation model trainer 245 trains, using machine learning, the bot intent generation model 250. The bot intent generation model trainer 245 trains the bot intent generation model 250 to receive the context of the telephone conversation, the audio data of a current utterance, and the previous intents of both speakers and output an intent for a reply to the current utterance.

In some implementations, the bot intent generation model trainer 245 trains multiple models for different contexts. For example, the bot intent generation model trainer 245 identifies the training samples for the task of making a hair appointment and trains a bot intent generation model for use when the task involves making a hair appointment.

In some implementations, the bot intent generation model trainer 245 selects the training samples related to generating the intent for the person requesting the task. For example, if the task involves making an appointment at a hair salon, then the bot intent generation model trainer 245 may select the training samples that include audio data of utterances spoken by an employee or representative of the hair salon. If the task involves making a reservation at a restaurant, then the bot generation model trainer 245 may select the training samples that include audio data of utterance spoken by an employee or representative of the restaurant. The bot intent generation model trainer 245 may select these samples because the call initiating system typically performs tasks that involve calling businesses that have a human answer the telephone.

In some implementations, the system 200 includes feedback data 255. The bot intent generation model trainer 245 may access feedback data 255 to tune the bot intent generation model 250. The bot intent generation model 250 may require updating or tuning if the bot is completed a task successfully. If the bot successfully completed the task, then the conversation between the bot and the human may be used as feedback data 255 to update the model. The conversation may be added to the training data 215 using the process described above. The feedback data 255 may also include data related to the bot being unable to complete a task. The bot intent generation model trainer 245 may further train the bot intent generation model 250 based on the conversation between the bot and the human when the bot was unable to complete the task. The inability of the bot being able to complete the task may be related to the bot's inability to conduct a conversation, not the restaurant being booked or the hair salon being closed, for example.

Figure 3:
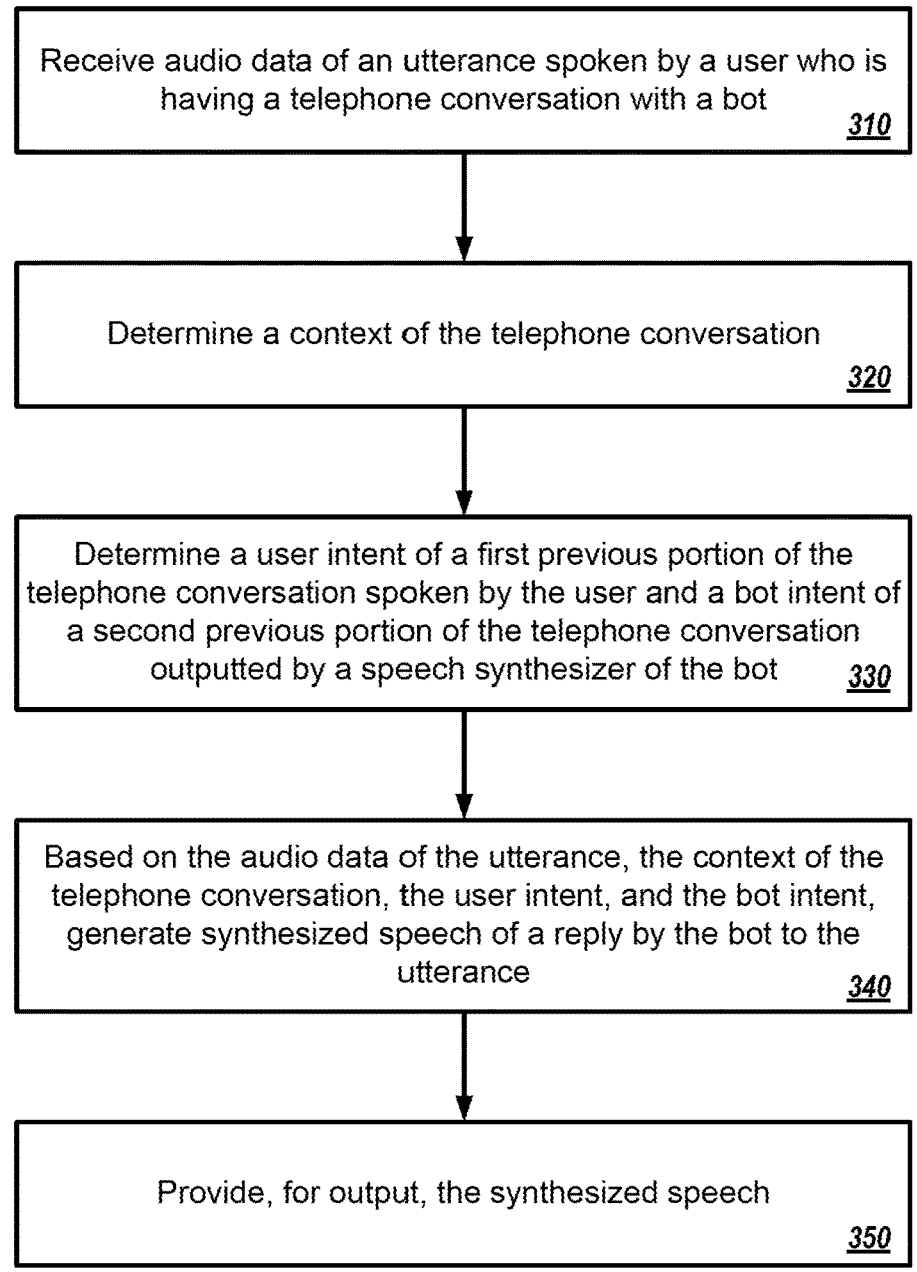
FIG. 3 is a flowchart of an example process conducting a telephone conversation with a human using a bot.

FIG. 3 is a flowchart of an example process 300 conducting a telephone conversation with a human using a bot. In general, the process 300 receives audio data of an utterance spoken by the human. The process 300 uses the audio data of the utterance along, the context of the telephone conversation, and any previous intents from the telephone conversation to generate an intent for how the bot will respond to the utterance. The process 300 uses the intent to generate synthesized speech for a response by the bot. The process 300 will be described as being performed by a computer system comprising one or more computers, for example, the system 100 of FIG. 1 and/or system 200 of FIG. 2.

The system receives audio data of an utterance spoken by a user who is having a telephone conversation with a bot (310). In some implementations, the system is configured to initiate telephone calls and conduct telephone conversations with the user using the bot. The system may place a telephone call in response to a user requesting that a task be performed. The task may be one that requires placing a telephone call, such as calling a restaurant to make a reservation when the restaurant does not participate in any online reservation systems. The utterance may occur at the beginning of the telephone conversation, such as when the user answers the telephone or later in the conversation after both the user and the bot have spoken. In some implementations, the conversation between the user and the bot is not a telephone conversation. The conversation may be over a digital assistant device or any other device or application that is configured to receive speech from a human and respond with synthesized speech. These types of conversations may occur over a smart speaker, mobile phone, tablet computer, laptop computer, smart watch, or any other similar computing device.

The system determines a context of the telephone conversation (320). In some implementations, the context of the telephone conversation includes an identity of an entity associated with the user and the task requested by the user. For example, the identity of the entity may be Burger Palace, which is the restaurant that the system called. The task requested may be to make a reservation for today at 7 pm for two people at Burger Palace. In some implementations, the context may also include the time that the system placed the call.

The system determines a user intent of a first previous portion of the telephone conversation spoken by the user and a bot intent of a second previous portion of the telephone conversation outputted by a speech synthesizer of the bot (330). The intent may identify the type of information conveyed in each portion of the telephone conversation. A portion of the telephone conversation may include a speaker's turn in the telephone conversation. This may be similar to a speaker's line in a dialog. The line may be less than a sentence, a sentence, or more than one sentence. For example, a user may answer the telephone and say, "Hello, thank you for calling Burger Palace. How may I direct your call?" This utterance may have an intent associated with it such as "hello <thank caller> <offer assistance>." This intent may capture the goal of the speaker without including all the details of a transcription of the utterance. In some instances, different transcriptions may correspond to the same intent.

The system may determine or access the intents of the previous portions of the telephone conversation. For example, the first utterance will not have any previous portions of the telephone conversation and thus, no previous intents. If the user has spoken two utterances and the system has outputted two synthesized utterances, then the system will access two intents for the user's two previous utterances and two intents for the system's two previous synthesized utterances when the user speaks a third time. As the telephone conversation continues, the number of intents for that conversation increases.

The system, based on the audio data of the utterance, the context of the telephone conversation, the user intent, and the bot intent, generates synthesized speech of a reply by the bot to the utterance (340). In some implementations, the system generates the synthesized speech of the reply by the bot without performing speech recognition on the utterance. The system may perform speech recognition on the audio data of the utterance after generating the synthesized speech of the reply by the bot if the system later generates the intent of the utterance.

In some implementations, the model outputs an intent for how the bot should respond to the utterance. The system generates a transcription for the reply based on that intent. In some implementations, the system may use the context of the telephone conversation to generate the transcription using the intent. The system provides the transcription of the reply to a speech synthesizer.

In some implementations, the system uses a model to generate the intent for the bot's reply to the utterance. The system provides the audio data of the utterance, the context of the telephone conversation, and any previous intents as inputs to the model. The model outputs the intent for the bot's reply.

The system may train the model using machine learning and training data that is based on past, completed telephone conversations. The system may generate training samples based on the past telephone conversations. The system may generate multiple training samples for a single conversation. For example, the system may generate three training samples for a conversation where a first speaker spoke twice and a second speaker spoke twice. The system may generate four training samples for a conversation where a first speaker spoke three times and a second speaker spoke twice. The system may generate a training sample for each utterance after the first utterance.

Each training sample may include the context of the conversation, the previous intents of a first speaker, the previous intents of a second speaker, the audio data of a particular utterance, and the intent of the reply to that particular utterance. The context of the conversation, the previous intents of a first speaker, the previous intents of a second speaker, and the audio data of a particular utterance are the inputs of the training sample, and the intent of the reply to that particular utterance is the output of the training sample. In this sense, the system trains the model to receive the context of the conversation, the previous intents of a first speaker, the previous intents of a second speaker, and the audio data of a particular utterance and output the intent for a reply to the particular utterance.

The system provides, for output, the synthesized speech (350). The system may detect a reply to the synthesized speech and repeat the process 300 again with the intent of the synthesized speech and/or the intent of the audio data of the utterance and inputs to the model.

In more detail, conventional spoken language understanding systems consist of two main components: an automatic speech recognition module that converts audio to a transcript, and a natural language understanding module that transforms the resulting text (or top N hypotheses) into a set of domains, intents, and arguments. These modules may be optimized independently. This specification formulates audio to semantic understanding as a sequence-to-sequence problem. The specification proposes and compares various encoder-decoder based approaches that optimize both modules jointly, in an end-to-end manner. Evaluations on a real-world task show that 1) having an intermediate text representation is crucial for the quality of the predicted semantics, especially the intent arguments and 2) jointly optimizing the full system improves overall accuracy of prediction. Compared to independently trained models, the best jointly trained model achieves similar domain and intent prediction F1 scores, but improves argument word error rate by 18% relative. This description relates to spoken language understanding, sequence-to-sequence, end-to-end training, multi-task learning, and speech recognition.

Understanding semantics from a user input or a query is central to any human computer interface (HCI) that aims to interact naturally with users. Spoken dialogue systems may be configured to solve specific tasks. With the widespread adoption of smart devices and digital assistants, spoken language understanding (SLU) is moving to the forefront of HCI. In some implementations, SLU involves multiple modules. An automatic speech recognition system (ASR) first transcribes the user query into a transcript. This is then fed to a module that does natural language understanding (NLU). NLU may refer to the component that predicts domain, intent, and slots given the ASR transcript. SLU may refer to the full system that predicts the aforementioned starting from audio. NLU itself involves domain classification, intent detection, and slot filling. In some NLU systems, first the high level domain of a transcript is identified. Subsequently, intent detection and slot filling are performed according to the predicted domain's semantic template. Intent detection identifies the finergrained intent class a given transcript belongs to. Slot filling, or argument prediction, (slots and arguments may be used interchangeably) is the task of extracting semantic components, like the argument values corresponding to the domain. FIG. 4 shows example transcripts and their corresponding domain, intent, and arguments. In some instances, only arguments that have corresponding values in a transcript are shown. For example, song name and station name are both arguments in the MEDIA domain but only one has a corresponding value in each of the MEDIA examples. In some implementations, jointly optimizing these three tasks improves the overall quality of the NLU component. For conciseness, the word semantics may refer to all three of domain, intent and arguments.

Even though user interactions in an SLU system start as a voice query, most NLU systems assume that the transcript of the request is available or obtained independently. The NLU module is typically optimized independent of ASR. While accuracy of ASR systems has improved, errors in recognition worsen NLU performance. This problem gets exacerbated on smart devices, where interactions tend to be more conversational. However, not all ASR errors are equally bad for NLU. For most applications, the semantics consist of an action with relevant arguments; a large part of the transcript of the ASR module may have no impact on the end result as long as intent classification and predicted arguments are accurate. For example, for a user query, "Set an alarm at two o'clock," intent, "alarm," and its arguments, 'two o'clock', are more important than filler words, like 'can'. Joint optimization can focus on improving those aspects of transcription accuracy that are aligned with the end goal, whereas independent optimization fails at that objective. Furthermore, for some applications, there are intents that are more naturally predicted from audio compared to transcript. For example, when training an automated assistant, like a call initiating system or an airline travel assistant, it may be useful to identify acoustic events like background noise, music and other non-verbal cues as special intents, and tailor the assistant's response accordingly to improve the overall user experience. Hence, training various components of the SLU system jointly can be advantageous.

In some implementations, a system may use audio to perform NLU. Domain and intent may be predicted directly from audio, and this approach may be performed competitively, but worse than predicting from transcript. Alternatively, using multiple ASR hypothesis or the word confusion network or the recognition lattice may account for ASR errors, but independent optimization of ASR and NLU can still lead to sub-optimal performance. In some implementations, an ASR correcting module is trained jointly with NLU component. To account for ASR errors, multiple ASR hypotheses are generated during training as additional input sequences, which are then error-corrected by the slot-filling model. While the slot-filling module is trained to account for the errors, the ASR module is still trained independent of NLU. In some implementations, an end-to-end system may be used that does intent classification directly from speech, with an intermediate ASR task. The system uses a connectionist temporal classification (CTC) acoustic model, and may only perform intent prediction. In some implementations, NLU, e.g., domain, intent, and argument prediction can be done jointly with ASR starting directly from audio and with a quality of performance that matches or surpasses an independently trained counterpart.

The systems describes are motivated by the encoder-decoder based sequence-to-sequence (Seq2Seq) approach that performs well for machine translation and speech recognition tasks. Encoder-decoder based approaches provide an attractive framework to implementing SLU systems, since the attention mechanism allows for jointly learning an alignment while predicting a target sequence that has a many-to-one relationship with its input. Such techniques may be used in NLU, but using ASR transcripts, not audio, as input to the system.

Various end-to-end approaches to SLU for jointly predicting semantics from audio may be compared. These techniques may reduce the overall architecture of SLU systems. Using a large training set comparable to what is typically used for building large-vocabulary ASR systems, the description below shows that not only can predicting semantics from audio be competitive, it can in some conditions outperform the conventional two-stage approach. This discussion shows that all three of domain, intent, and arguments can be predicted from audio with competitive results.

Figure 5:
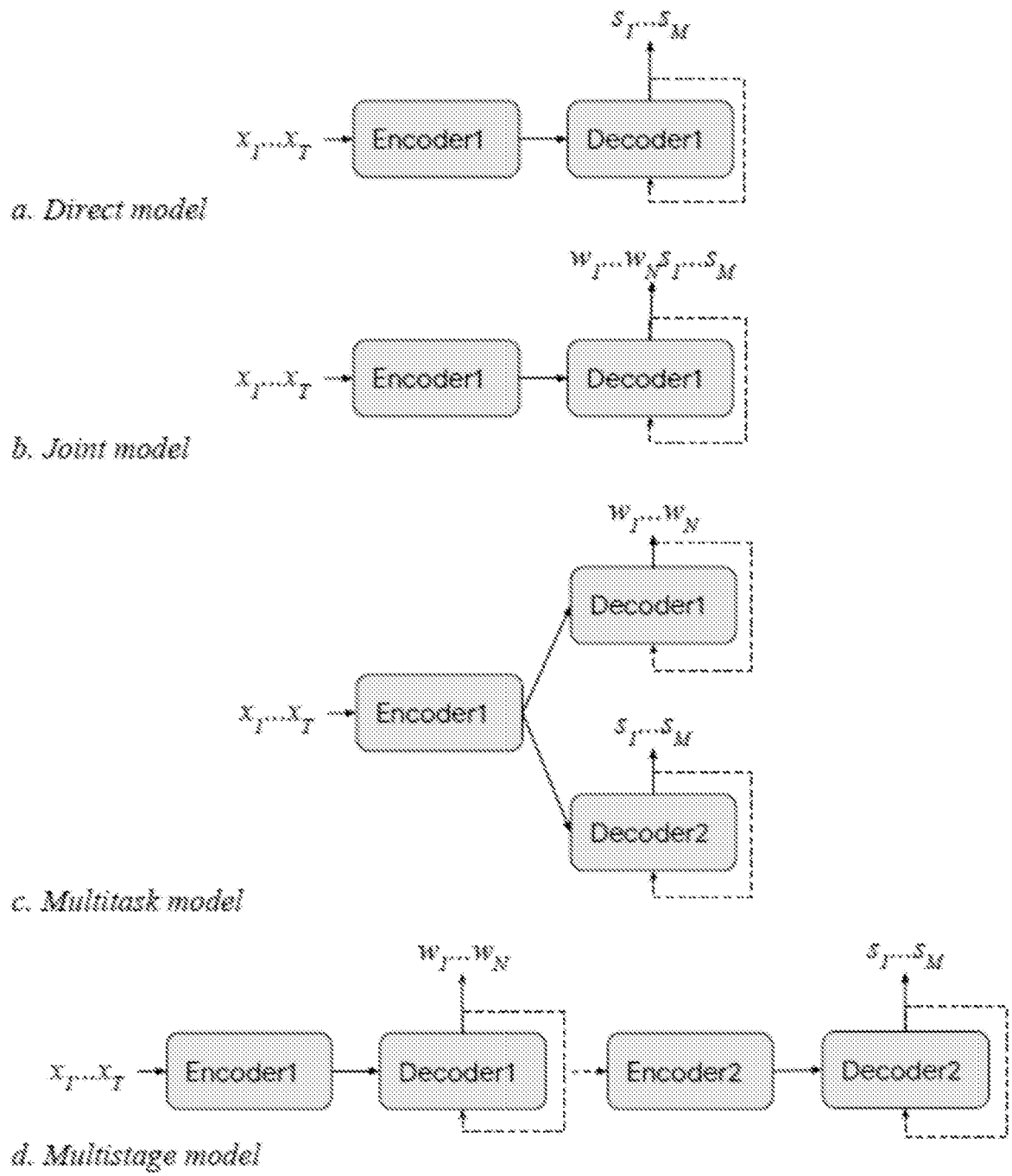
FIG. 5 illustrates example models used while conducting a telephone conversation with a human using a bot.

The system includes an encoder-decoder framework augmented by attention. There may be multiple ways to model an end-to-end SLU system. One can either predict semantics directly from audio, ignoring the transcript, or have separate modules for predicting the transcript and semantics that are optimized jointly. These different approaches and the corresponding formulation are described below. FIG. 5 shows a schematic representation of these architectures. In the discussion below and in FIG. 5, X stands for acoustic features, W for transcripts and S for semantics (domain, intent and arguments). Dotted lines represent both the conditioning of output label on its history and the attention module, which is treated as a part of the decoder.

For a general encoder-decoder framework, the input and output sequences may be denoted by $A=\{a_1, \ldots a_K\}$ and $B=\{b_1, \ldots, b_L\}$, where K and L denote their lengths. In this discussion, since the system starts with audio, the input sequence to the model are acoustic features, the details of acoustic feature computation are describe below, while the output sequence, depending on the model architecture, may be the transcript, the corresponding semantics, or both. While the semantics of an utterance may be represented as structured data, this discussion uses a deterministic scheme for serializing it by first including the domain and intent, followed by the argument labels and their values as shown in Table 1. The discussion below denotes the input acoustic features by $X=\{x_1, \ldots, x_T\}$, where T stands for the total number of time frames. The transcript is represented as a sequence of graphemes. It is denoted as $W=\{w_1, \ldots, w_N\}$, where N stands for the number of graphemes in the transcript. The semantics sequence is represented by $S=\{s_1, \ldots, s_M\}$, where M stands for the number of tokens. The tokens come from a dictionary consisting of the domain, intent, argument labels, and graphemes to represent the argument values.

TABLE 1

Example transcripts and their corresponding serialized semantics.

| Transcript | Serialized Semantics |
|---|---|
| "can you set an alarm for 2 p.m." | <DOMAIN><PRODUCTIVITY><INTENT><SET_ALARM><DATETIME>2 p.m. |
| "remind me to buy milk" | <DOMAIN><PRODUCTIVITY><INTENT><ADD_REMINDER><SUBJECT>buy milk |
| "next song please" | <DOMAIN><MEDIA_CONTROL> |
| "how old is barack obama" | <DOMAIN><NONE> |

Given the training pair (A, B) and model parameters θ, a sequence-to-sequence model computes the conditional probability $P(B|A; \theta)$. This can be done by estimating the terms of the probability using chain rule:

$$P(B|A;\theta) = \pi_{i=1}^{L} P(b_i | b_1, \ldots, b_{i-1}, A; \theta) \quad (1)$$

The parameters of the model are learned by maximizing the conditional probabilities for the training data:

$$\theta^* = \text{argmax}_\theta \Sigma_{(A,B)} \log(B|A;\theta) \quad (2)$$

In the encoder-decoder framework, the model is parameterized as a neural network, such as a recurrent neural network, consisting of two main parts: An encoder that receives the input sequence and encodes it into a higher level representation, and a decoder that generates the output from this representation after first being fed a special start-of-sequence symbol. Decoding terminates when the decoder emits the special end-of-sequence symbol. The modeling power of encoder-decoder framework may be improved by the addition of an attention mechanism. This mechanism helps overcome the bottleneck of having to encode the entire variable length input sequence in a single vector. At each output step, the decoder's last hidden state is used to generate an attention vector over the entire encoded input sequence, which is used to summarize and propagate the needed information from the encoder to the decoder at every output step. In some implementations, a system uses multi-headed attention that allows the decoder to focus on multiple parts of the input when generating each output.

In the direct model, the semantics of an utterance are directly predicted from the audio. The model does not learn to fully transcribe the input audio; it learns to only transcribe parts of the transcript that appear as argument values. Conceptually, this may be an end-to-end semantics prediction. But it also makes the task challenging, since the model has to implicitly learn to ignore parts of the transcript that is not part of an argument and the corresponding audio, while also inferring the domain and intent in the process.

Following the notation introduced above, the model directly computes $P(S|X;\theta)$, as in Equation 1. The encoder takes the acoustic features, X, as input and the decoder generates the semantic sequence, S.

The joint model may consist of an encoder and a decoder, similar to the direct model, but the decoder generates the transcript followed by domain, intent, and arguments. The output of this model is thus the concatenation of transcript and its corresponding semantics: [W:S] where [:] denotes concatenation of the first and the second sequence. This formulation conditions intent and argument prediction on the transcript:

$$P(S, W|X;\theta) = P(S|W,X;\theta) P(W|X;\theta) \quad (3)$$

This model may be similar to the direct model, while simultaneously making learning easier by introducing an intermediate transcript representation corresponding to the input audio.

Multitask learning (MTL) may be used when learning related tasks, typically with limited data. Related tasks act as inductive bias, improving generalization of the main task by choosing parameters that are optimal for all tasks. Although predicting the text transcript is not necessary for domain, intent and argument prediction, it is a natural secondary task that can potentially offer a strong inductive bias while learning. In MTL, $P(S,W|X;\theta)$ is factorized as:

$$P(S, W|X;\theta) = P(S|X;\theta) P(W|X;\theta) \quad (4)$$

In the case of neural nets, multitask learning may be done by sharing hidden representations between tasks. This may be accomplished by sharing the encoder and having separate decoders for predicting transcripts and semantics. The system then learns parameters that optimize both tasks:

$$\theta^* = \text{argmax}_\theta \Sigma_{(X,W,S)} \log P(W|X;\theta_e,\theta_d^W) + \log P(S|X;\theta_e, \theta_d^S) \quad (5)$$

where, $\theta=(\theta_e, \theta_d^W, \theta_d^S)$. $\theta_e, \theta_d^W, \theta_d^S$ are the parameters of the shared encoder, the decoder that predicts the transcript, and the decoder that predicts semantics, respectively. The shared encoder learns representations that enable both transcript and semantics prediction.

Multistage (MS) model, when trained under the maximum likelihood criterion, may be similar to an approach of training the ASR and NLU components independently. In MS modeling, semantics are assumed to be conditionally independent of acoustics given the transcript:

$$P(S, W|X;\theta) = P(S|W;\theta) P(W|X;\theta) \quad (6)$$

Given this formulation, θ can be learned as:

$$\theta^* = \text{argmax}_\theta \Sigma_{(X,W,S)} \log P(W|X;\theta^W) + \log P(S|X;\theta^S) \quad (7)$$

Here, $\theta^W$, $\theta^S$ are, respectively, the parameters of the first stage, which predicts the transcript, and the second stage, which predicts semantics. For each training example, the triplet (X, W, S) may be available. As a result, the two terms in Equation 6 can be independently optimized, thereby reducing the model to a conventional 2-stage SLU system. In some implementations, it is possible to weakly tie the two stages together during training by using the predicted W at each time-step and allowing the gradients to pass from the second stage to the first stage through that label index. In some implementations, W may be picked from the first stage to propagate to the second stage, like the argmax of the softmax layer or sampling from the multinomial distribution induced by the softmax layer. By weakly tying the two stages, the first stage may be optimized jointly with the second stage, based on the criterion that is relevant for both stages.

One of the advantages of the multistage approach is that the parameters for the two tasks are decoupled. Therefore, the system can use different corpora to train each stage. In some implementations, the amount of data available to train a speech recognizer exceeds the amount available to train an NLU system. In such cases, the system can use the available ASR training data to tune the first stage and finally train the entire system using whatever data is available to train jointly. Furthermore, a stronger coupling between the two stages can be made when optimizing alternative loss criterion like the minimum Bayes risk (MBR).

This specification proposes and evaluates multiple end-to-end approaches to SLU that optimize the ASR and NLU components of the system jointly. The specification discusses that joint optimization results in better performance not just when doing end-to-end domain, intent, and argument prediction, but also when using the transcripts generated by a jointly trained end-to-end model and a conventional CFG-parsers for NLU.

This specification illustrates that having an intermediate text representation is important when learning SLU systems end-to-end. Joint optimization can help the model focus on errors that matter more for SLU as evidenced by the lower argument WERs obtained by models that couple ASR and NLU. In some implementations, direct prediction of semantics from audio by ignoring the ground truth transcript may be used.

The amount of training data that is available to train ASR is usually several times larger than what is available to train NLU systems. A jointly optimized model can make use of ASR data to improve performance. For optimization, some systems use the cross-entropy loss. Some systems may use more task specific losses, like MBR, that optimizes intent and argument prediction accuracy directly. In some instances, incorporating new grammars with limited training data into an end-to-end system may be possible. The CFG-parsing based approach that decouples itself from ASR can easily incorporate additional grammars. But end-to-end optimization relies on data to learn new grammars, making the introduction of new domains a possibility.

Framing spoken language understanding as a sequence to sequence problem that is optimized end-to-end significantly simplifies the overall complexity. It is possible to scale such models to more complex tasks, e.g., tasks that involve multiple intents within a single user input, or tasks for which it is not easy to create a CFG-based parser. The ability to run inference without the need of additional resources like a lexicon, language models and parsers also make them ideal for deploying on devices with limited compute and memory footprint.

Figure 6:
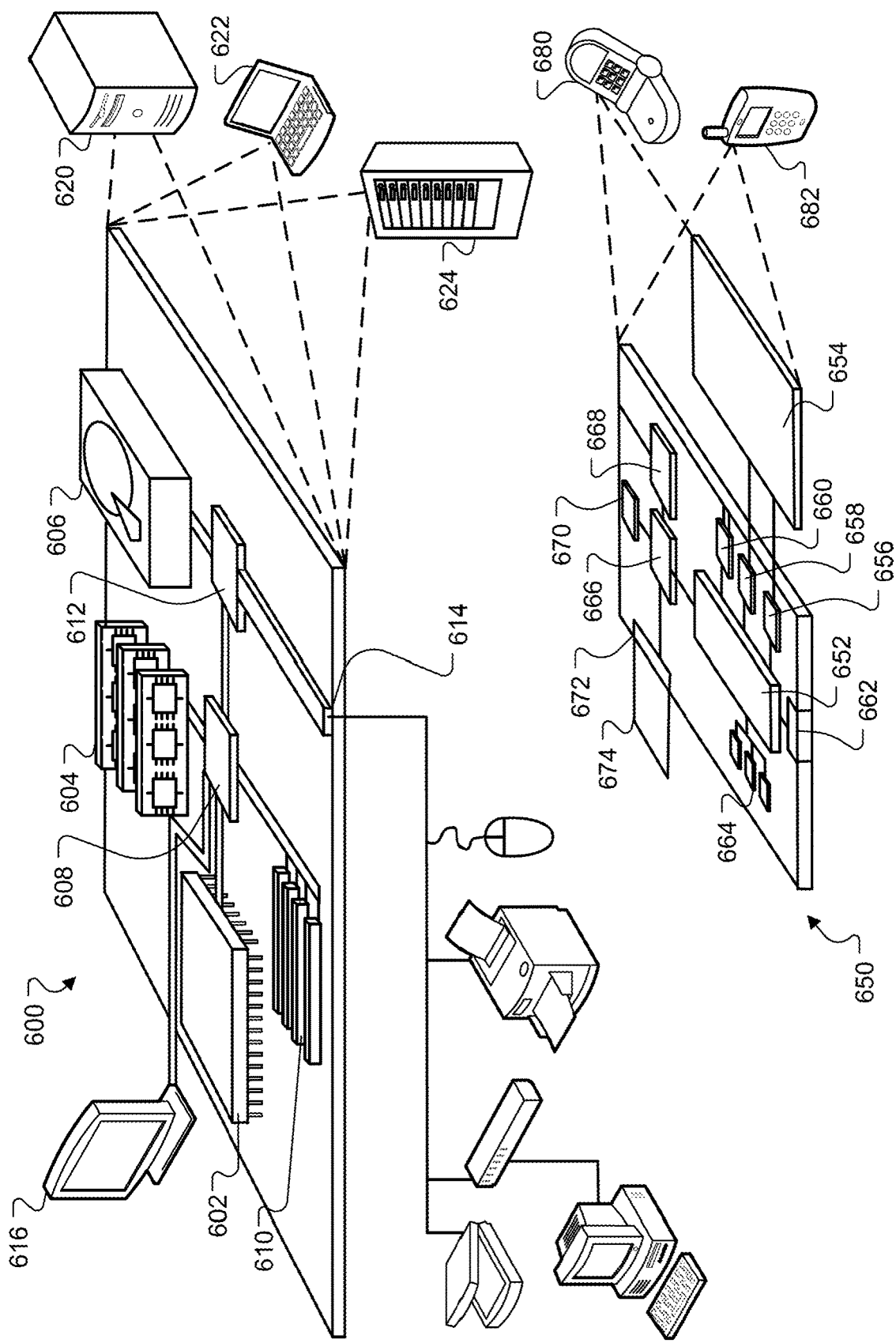
FIG. 6 is an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. In some implementations, the systems and techniques described here can be implemented on an embedded system where speech recognition and other processing is performed directly on the device.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A method implemented by one or more processors, the method comprising:
   receiving audio data of an utterance spoken by a user during a portion of an ongoing conversation between the user and a bot, the audio data being captured by one or more microphones of a computing device of the user;
   determining, based on processing the audio data of the utterance spoken by the user during the portion of the ongoing conversation between the user and the bot, a representation of the utterance received during the portion of the ongoing conversation;
   determining a context of the ongoing conversation between the user and the bot, the context of the ongoing conversation between the user and the bot being based on one or more previous portions of the ongoing conversation between the user and the bot, and the one or more previous portions of the ongoing conversation between the user and the bot occurring prior to receiving the utterance spoken by the user during the portion of the ongoing conversation between the user and the bot;
   determining a corresponding user intent for one or more of the previous portions of the ongoing conversation between the user and the bot;
   causing, based on processing at the least (i) the representation of the utterance received during the ongoing conversation, (ii) the context of the ongoing conversation, and (iii) the corresponding user intent for one or more of the previous portions of the ongoing conversation, a reply by the bot, to the utterance, to be generated; and
   causing synthesized speech, that captures the reply by the bot to the utterance, to be provided for audible presentation to the user, the synthesized speech being provided for audible presentation to the user via one or more speakers of a computing device of the user.

2. The method of claim 1, wherein the context of the ongoing conversation comprises one or more of: a task associated with the conversation, a time the conversation is initiated, or a location associated with the user.

3. The method of claim 1, wherein causing the synthesized speech to be generated comprises:
   processing, using a speech synthesizer, the reply by the bot to generate the synthesized speech.

4. The method of claim 1, wherein the utterance includes a request to perform a task.

5. The method of claim 4, further comprising:
   based on the ongoing conversation:
      determining whether the task has been completed; and
      in response to determining that the task has been completed:
         causing the bot to terminate the conversation.

6. The method of claim 5, further comprising:
   in response to determining that the task has not been completed:
      causing the bot to continue the conversation.

7. A system comprising:
   at least one processor; and
   memory storing instructions that, when executed by the at least one processor, cause the at least one processor to:
      receive audio data of an utterance spoken by a user during a portion of an ongoing conversation between the user and a bot, the audio data being captured by one or more microphones of a computing device of the user;
      determine, based on processing the audio data of the utterance spoken by the user during the portion of the ongoing conversation between the user and the bot, a representation of the utterance received during the portion of the ongoing conversation;
      determine a context of the ongoing conversation between the user and the bot, the context of the ongoing conversation between the user and the bot being based on one or more previous portions of the ongoing conversation between the user and the bot, and the one or more previous portions of the ongoing conversation between the user and the bot occurring prior to receiving the utterance spoken by the user during the portion of the ongoing conversation between the user and the bot;
      determine a corresponding user intent for one or more of the previous portions of the ongoing conversation between the user and the bot;

cause, based on processing at the least (i) the representation of the utterance received during the ongoing conversation, (ii) the context of the ongoing conversation, and (iii) the corresponding user intent for one or more of the previous portions of the ongoing conversation, a reply by the bot, to the utterance, to be generated; and cause synthesized speech, that captures the reply by the bot to the utterance, to be provided for audible presentation to the user, the synthesized speech being provided for audible presentation to the user via one or more speakers of a computing device of the user.

8. The system of claim 7, wherein the context of the ongoing conversation comprises one or more of: a task associated with the conversation, a time the conversation is initiated, or a location associated with the user.

9. The system of claim 8, wherein the instructions to cause the synthesized speech to be generated comprise instructions to:

process, using a speech synthesizer, the reply by the bot to generate the synthesized speech.

10. The system of claim 7, wherein the utterance includes a request to perform a task.

11. The system of claim 10, wherein the instructions further comprise instructions to:

based on the ongoing conversation:
determine whether the task has been completed; and
in response to determining that the task has been completed:
cause the bot to terminate the conversation.

12. The system of claim 11, wherein the instructions further comprise instructions to:

in response to determining that the task has not been completed:
cause the bot to continue the conversation.

13. A non-transitory computer-readable storage medium storing instructions that, when executed by at least one processor, cause the at least one processor to perform operations, the operations comprising:

receiving audio data of an utterance spoken by a user during a portion of an ongoing conversation between the user and a bot, the audio data being captured by one or more microphones of a computing device of the user;

determining, based on processing the audio data of the utterance spoken by the user during the portion of the ongoing conversation between the user and the bot, a representation of the utterance received during the portion of the ongoing conversation;

determining a context of the ongoing conversation between the user and the bot, the context of the ongoing conversation between the user and the bot being based on one or more previous portions of the ongoing conversation between the user and the bot, and the one or more previous portions of the ongoing conversation between the user and the bot occurring prior to receiving the utterance spoken by the user during the portion of the ongoing conversation between the user and the bot;

determining a corresponding user intent for one or more of the previous portions of the ongoing conversation between the user and the bot;

causing, based on processing at the least (i) the representation of the utterance received during the ongoing conversation, (ii) the context of the ongoing conversation, and (iii) the corresponding user intent for one or more of the previous portions of the ongoing conversation, a reply by the bot, to the utterance, to be generated; and causing synthesized speech, that captures the reply by the bot to the utterance, to be provided for audible presentation to the user, the synthesized speech being provided for audible presentation to the user via one or more speakers of a computing device of the user.

14. The non-transitory computer-readable storage medium of claim 13, wherein the context of the ongoing conversation comprises one or more of: a task associated with the conversation, a time the conversation is initiated, or a location associated with the user.

15. The non-transitory computer-readable storage medium of claim 13, wherein causing the synthesized speech to be generated comprises:

processing, using a speech synthesizer, the reply by the bot to generate the synthesized speech.

16. The non-transitory computer-readable storage medium of claim 13, wherein the utterance includes a request to perform a task.

17. The non-transitory computer-readable storage medium of claim 16, further comprising:

based on the ongoing conversation:
determining whether the task has been completed; and
in response to determining that the task has been completed:
causing the bot to terminate the conversation.

18. The non-transitory computer-readable storage medium of claim 17, further comprising:

in response to determining that the task has not been completed:
causing the bot to continue the conversation.

* * * * *